(12) United States Patent
Manssen et al.

(10) Patent No.: US 9,020,446 B2
(45) Date of Patent: *Apr. 28, 2015

(54) METHOD AND APPARATUS FOR CALIBRATING A COMMUNICATION DEVICE

(71) Applicant: BlackBerry Limited, Waterloo (CA)

(72) Inventors: Keith Manssen, Crystal Lake, IL (US); Daniel Charles Boire, Nashua, NH (US); Matthew Russell Greene, Waterloo (CA)

(73) Assignee: Blackberry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/312,900

(22) Filed: Jun. 24, 2014

(65) Prior Publication Data

US 2014/0302800 A1     Oct. 9, 2014

Related U.S. Application Data

(63) Continuation of application No. 13/904,321, filed on May 29, 2013, now Pat. No. 8,787,845, which is a continuation of application No. 12/547,411, filed on Aug. 25, 2009, now Pat. No. 8,472,888.

(51) Int. Cl.
*H04B 1/40* (2006.01)
*H04B 1/04* (2006.01)

(52) U.S. Cl.
CPC ............... *H04B 1/40* (2013.01); *H04B 1/0458* (2013.01)

(58) Field of Classification Search
CPC .... H04B 1/0458; H04B 7/18567; H04B 1/18; H04B 1/40

USPC ............ 455/67.14, 77, 82, 87, 120, 123, 133, 455/160.1, 178.1, 195.1, 424, 425, 456.5, 455/456.6, 550.1; 343/850; 333/17.3
See application file for complete search history.

(56) References Cited

U.S. PATENT DOCUMENTS

| | | | |
|---|---|---|---|
| 2,745,067 A | 5/1956 | True | |
| 3,117,279 A | 1/1964 | Ludvigson | |

(Continued)

FOREIGN PATENT DOCUMENTS

| CN | 101640949 A | 2/2010 |
|---|---|---|
| DE | 19614655 | 10/1997 |

(Continued)

OTHER PUBLICATIONS

Bezooijen, A. et al., "A GSM/EDGE/WCDMA Adaptive Series-LC Matching Network Using RF-MEMS Switches", IEEE Journal of Solid-State Circuits, vol. 43, No. 10, Oct. 2008, 2259-2268.

(Continued)

*Primary Examiner* — Nhan Le
(74) *Attorney, Agent, or Firm* — Guntin & Gust, PLC; Andrew Gust (57) ABSTRACT

A system that incorporates teachings of the present disclosure may include, for example, a computer-readable storage medium having computer instructions to perform actual measurements of one or more performance parameters of a communication device according to a subset of tuning states of a tunable matching network operable in a communication device, determine estimated measurements of the one or more performance parameters of the communication device for a portion of the tuning states not included in the subset of tuning states according to the actual measurements, identify a data set for each of the one or more performance parameters from at least portions of the tuning states and the actual and estimated measurements, and determine from at least a portion of the date sets one or more tuning states that achieve at least one desirable performance characteristic of the communication device. Additional embodiments are disclosed.

20 Claims, 9 Drawing Sheets

(56) References Cited

U.S. PATENT DOCUMENTS

| | | |
|---|---|---|
| 3,160,832 A | 12/1964 | Beitman |
| 3,390,337 A | 6/1968 | Beitman |
| 3,443,231 A | 5/1969 | Roza |
| 3,509,500 A | 4/1970 | McNair |
| 3,571,716 A | 3/1971 | Hill |
| 3,590,385 A | 6/1971 | Sabo |
| 3,601,717 A | 8/1971 | Kuecken |
| 3,742,279 A | 6/1973 | Kupsky |
| 3,749,491 A | 7/1973 | Maxfield et al. |
| 3,794,941 A | 2/1974 | Templin |
| 3,919,644 A | 11/1975 | Smolka |
| 3,990,024 A | 11/1976 | Hou |
| 3,995,237 A | 11/1976 | Brunner |
| 4,186,359 A | 1/1980 | Kaegebein |
| 4,201,960 A | 5/1980 | Skutta |
| 4,227,256 A | 10/1980 | O'Keefe |
| 4,383,441 A | 5/1983 | Willis |
| 4,476,578 A | 10/1984 | Gaudin |
| 4,493,112 A | 1/1985 | Bruene |
| 4,509,019 A | 4/1985 | Banu et al. |
| 4,777,490 A | 10/1988 | Sharma |
| 4,799,066 A | 1/1989 | Deacon |
| 4,965,607 A | 10/1990 | Wilkins |
| 4,980,656 A | 12/1990 | Duffalo |
| 5,032,805 A | 7/1991 | Elmer |
| 5,136,478 A | 8/1992 | Bruder |
| 5,142,255 A | 8/1992 | Chang |
| 5,177,670 A | 1/1993 | Shinohara |
| 5,195,045 A | 3/1993 | Keane |
| 5,200,826 A | 4/1993 | Seong |
| 5,212,463 A | 5/1993 | Babbitt |
| 5,215,463 A | 6/1993 | Marshall et al. |
| 5,243,358 A | 9/1993 | Sanford |
| 5,258,728 A | 11/1993 | Taniyoshi |
| 5,276,912 A | 1/1994 | Siwiak |
| 5,301,358 A | 4/1994 | Gaskill |
| 5,307,033 A | 4/1994 | Koscica |
| 5,310,358 A | 5/1994 | Johnson |
| 5,312,790 A | 5/1994 | Sengupta |
| 5,334,958 A | 8/1994 | Babbitt |
| 5,361,403 A | 11/1994 | Dent |
| 5,371,473 A | 12/1994 | Trinh |
| 5,409,889 A | 4/1995 | Das |
| 5,427,988 A | 6/1995 | Sengupta |
| 5,430,417 A | 7/1995 | Martin |
| 5,446,447 A | 8/1995 | Carney |
| 5,448,252 A | 9/1995 | Ali |
| 5,451,567 A | 9/1995 | Das |
| 5,451,914 A | 9/1995 | Stengel |
| 5,457,394 A | 10/1995 | McEwan |
| 5,472,935 A | 12/1995 | Yandrofski |
| 5,479,139 A | 12/1995 | Koscica |
| 5,486,491 A | 1/1996 | Sengupta |
| 5,496,795 A | 3/1996 | Das |
| 5,502,372 A | 3/1996 | Quan |
| 5,524,281 A | 6/1996 | Bradley |
| 5,548,837 A | 8/1996 | Hess et al. |
| 5,561,407 A | 10/1996 | Koscica |
| 5,564,086 A | 10/1996 | Cygan |
| 5,564,087 A | 10/1996 | Cygan |
| 5,583,359 A | 12/1996 | Ng et al. |
| 5,589,844 A | 12/1996 | Belcher et al. |
| 5,593,495 A | 1/1997 | Masuda |
| 5,635,433 A | 6/1997 | Sengupta |
| 5,635,434 A | 6/1997 | Sengupta |
| 5,640,042 A | 6/1997 | Koscica |
| 5,679,624 A | 10/1997 | Das |
| 5,689,219 A | 11/1997 | Piirainen |
| 5,693,429 A | 12/1997 | Sengupta |
| 5,694,134 A | 12/1997 | Barnes |
| 5,699,071 A | 12/1997 | Urakami |
| 5,721,194 A | 2/1998 | Yandrofski |
| 5,766,697 A | 6/1998 | Sengupta |
| 5,777,581 A | 7/1998 | Lilly |
| 5,778,308 A | 7/1998 | Sroka |
| 5,786,727 A | 7/1998 | Sigmon |
| 5,812,572 A | 9/1998 | King |
| 5,812,943 A | 9/1998 | Suzuki |
| 5,830,591 A | 11/1998 | Sengupta |
| 5,846,893 A | 12/1998 | Sengupta |
| 5,874,926 A | 2/1999 | Tsuru |
| 5,880,635 A | 3/1999 | Satoh |
| 5,886,867 A | 3/1999 | Chivukula |
| 5,892,482 A | 4/1999 | Coleman et al. |
| 5,929,717 A | 7/1999 | Richardson et al. |
| 5,940,030 A | 8/1999 | Hampel et al. |
| 5,963,871 A | 10/1999 | Zhinong |
| 5,969,582 A | 10/1999 | Boesch |
| 5,982,099 A | 11/1999 | Barnes et al. |
| 5,990,766 A | 11/1999 | Zhang |
| 6,009,124 A | 12/1999 | Smith |
| 6,020,787 A | 2/2000 | Kim |
| 6,020,795 A | 2/2000 | Kim |
| 6,029,075 A | 2/2000 | Das |
| 6,045,932 A | 4/2000 | Jia |
| 6,061,025 A | 5/2000 | Jackson |
| 6,074,971 A | 6/2000 | Chiu |
| 6,096,127 A | 8/2000 | Dimos |
| 6,100,733 A | 8/2000 | Dortu |
| 6,101,102 A | 8/2000 | Brand |
| 6,115,585 A | 9/2000 | Matero |
| 6,125,266 A | 9/2000 | Matero et al. |
| 6,133,883 A | 10/2000 | Munson |
| 6,172,385 B1 | 1/2001 | Duncombe |
| 6,215,644 B1 | 4/2001 | Dhuler |
| 6,242,989 B1 | 6/2001 | Barber |
| 6,281,748 B1 | 8/2001 | Klomsdorf et al. |
| 6,281,847 B1 | 8/2001 | Lee |
| 6,309,895 B1 | 10/2001 | Jaing |
| 6,343,208 B1 | 1/2002 | Ying |
| 6,377,142 B1 | 4/2002 | Chiu |
| 6,377,217 B1 | 4/2002 | Zhu |
| 6,377,440 B1 | 4/2002 | Zhu |
| 6,384,785 B1 | 5/2002 | Kamogawa |
| 6,404,614 B1 | 6/2002 | Zhu |
| 6,408,190 B1 | 6/2002 | Ying |
| 6,414,562 B1 | 7/2002 | Bouisse |
| 6,415,562 B1 | 7/2002 | Donaghue |
| 6,452,776 B1 | 9/2002 | Chakravorty |
| 6,461,930 B2 | 10/2002 | Akram |
| 6,466,774 B1 | 10/2002 | Okabe |
| 6,492,883 B2 | 12/2002 | Liang |
| 6,514,895 B1 | 2/2003 | Chiu |
| 6,525,630 B1 | 2/2003 | Zhu |
| 6,531,936 B1 | 3/2003 | Chiu |
| 6,535,076 B2 | 3/2003 | Partridge |
| 6,535,722 B1 | 3/2003 | Rosen |
| 6,538,603 B1 | 3/2003 | Chen |
| 6,556,102 B1 | 4/2003 | Sengupta |
| 6,556,814 B1 | 4/2003 | Klomsdorf |
| 6,570,462 B2 | 5/2003 | Edmonson |
| 6,590,468 B2 | 7/2003 | du Toit |
| 6,590,541 B1 | 7/2003 | Schultze |
| 6,597,265 B2 | 7/2003 | Liang |
| 6,608,603 B2 | 8/2003 | Alexopoulos |
| 6,624,786 B2 | 9/2003 | Boyle |
| 6,640,085 B1 | 10/2003 | Chatzipetros |
| 6,657,595 B1 | 12/2003 | Phillips |
| 6,661,638 B2 | 12/2003 | Jackson |
| 6,670,256 B2 | 12/2003 | Yang |
| 6,710,651 B2 | 3/2004 | Forrester |
| 6,724,611 B1 | 4/2004 | Mosley |
| 6,724,890 B1 | 4/2004 | Bareis |
| 6,737,179 B2 | 5/2004 | Sengupta |
| 6,759,918 B2 | 7/2004 | Du Toit |
| 6,765,540 B2 | 7/2004 | Toncich |
| 6,768,472 B2 | 7/2004 | Alexopoulos |
| 6,774,077 B2 | 8/2004 | Sengupta |
| 6,795,712 B1 | 9/2004 | Vakilian |
| 6,825,818 B2 | 11/2004 | Toncich |
| 6,839,028 B2 | 1/2005 | Lee |
| 6,845,126 B2 | 1/2005 | Dent |
| 6,859,104 B2 | 2/2005 | Toncich |
| 6,862,432 B1 | 3/2005 | Kim |

(56) References Cited

U.S. PATENT DOCUMENTS

| | | | |
|---|---|---|---|
| 6,864,757 | B2 | 3/2005 | Du Toit |
| 6,868,260 | B2 | 3/2005 | Jagielski |
| 6,875,655 | B2 | 4/2005 | Lin |
| 6,888,714 | B2 | 5/2005 | Shaw |
| 6,905,989 | B2 | 6/2005 | Ellis |
| 6,907,234 | B2 | 6/2005 | Karr |
| 6,920,315 | B1 | 7/2005 | Wilcox et al. |
| 6,922,330 | B2 | 7/2005 | Nielsen |
| 6,943,078 | B1 | 9/2005 | Zheng |
| 6,946,847 | B2 | 9/2005 | Nishimori |
| 6,949,442 | B2 | 9/2005 | Barth |
| 6,961,368 | B2 | 11/2005 | Dent |
| 6,964,296 | B2 | 11/2005 | Memory |
| 6,965,837 | B2 | 11/2005 | Vintola |
| 6,993,297 | B2 | 1/2006 | Smith |
| 6,999,297 | B1 | 2/2006 | Klee |
| 7,009,455 | B2 | 3/2006 | Toncich |
| 7,071,776 | B2 | 7/2006 | Forrester |
| 7,106,715 | B1 | 9/2006 | Kelton |
| 7,107,033 | B2 | 9/2006 | D du Toit |
| 7,113,614 | B2 | 9/2006 | Rhoads |
| 7,151,411 | B2 | 12/2006 | Martin |
| 7,176,634 | B2 | 2/2007 | Kitamura |
| 7,176,845 | B2 | 2/2007 | Fabrega-Sanchez |
| 7,180,467 | B2 | 2/2007 | Fabrega-Sanchez |
| 7,221,327 | B2 | 5/2007 | Toncich |
| 7,298,329 | B2 | 11/2007 | Diament |
| 7,312,118 | B2 | 12/2007 | Kiyotoshi |
| 7,332,980 | B2 | 2/2008 | Zhu |
| 7,332,981 | B2 | 2/2008 | Matsuno |
| 7,339,527 | B2 | 3/2008 | Sager |
| 7,369,828 | B2 | 5/2008 | Shamsaifar |
| 7,426,373 | B2 | 9/2008 | Clingman |
| 7,427,949 | B2 | 9/2008 | Channabasappa et al. |
| 7,453,405 | B2 | 11/2008 | Nishikido et al. |
| 7,468,638 | B1 | 12/2008 | Tsai |
| 7,469,129 | B2 | 12/2008 | Blaker et al. |
| 7,531,011 | B2 | 5/2009 | Yamasaki |
| 7,535,080 | B2 | 5/2009 | Zeng et al. |
| 7,535,312 | B2 | 5/2009 | McKinzie |
| 7,539,527 | B2 | 5/2009 | Jang |
| 7,557,507 | B2 | 7/2009 | Wu |
| 7,596,357 | B2 | 9/2009 | Nakamata |
| 7,633,355 | B2 | 12/2009 | Matsuo |
| 7,642,879 | B2 | 1/2010 | Matsuno |
| 7,655,530 | B2 | 2/2010 | Hosking |
| 7,667,663 | B2 | 2/2010 | Hsiao |
| 7,705,692 | B2 | 4/2010 | Fukamachi et al. |
| 7,711,337 | B2 | 5/2010 | McKinzie |
| 7,714,676 | B2 | 5/2010 | McKinzie |
| 7,714,678 | B2 | 5/2010 | du Toit et al. |
| 7,728,693 | B2 | 6/2010 | du Toit et al. |
| 7,760,699 | B1 * | 7/2010 | Malik ............ 370/342 |
| 7,768,400 | B2 | 8/2010 | Lawrence et al. |
| 7,786,819 | B2 | 8/2010 | Ella |
| 7,795,990 | B2 | 9/2010 | du Toit |
| 7,852,170 | B2 | 12/2010 | McKinzie |
| 7,856,228 | B2 * | 12/2010 | Lekutai et al. ............ 455/414.3 |
| 7,865,154 | B2 | 1/2011 | Mendolia |
| 7,907,094 | B2 | 3/2011 | Kakitsu et al. |
| 7,917,104 | B2 | 3/2011 | Manssen et al. |
| 7,949,309 | B2 | 5/2011 | Rofougaran |
| 7,969,257 | B2 | 6/2011 | du Toit |
| 7,983,615 | B2 * | 7/2011 | Bryce et al. ............ 455/41.2 |
| 7,991,363 | B2 | 8/2011 | Greene |
| 8,008,982 | B2 | 8/2011 | McKinzie |
| 8,072,285 | B2 | 12/2011 | Spears |
| 8,112,043 | B2 | 2/2012 | Knudsen et al. |
| 8,170,510 | B2 | 5/2012 | Knudsen et al. |
| 8,190,109 | B2 | 5/2012 | Ali et al. |
| 8,204,446 | B2 | 6/2012 | Scheer |
| 8,217,732 | B2 | 7/2012 | McKinzie |
| 8,299,867 | B2 | 10/2012 | McKinzie |
| 8,320,850 | B1 | 11/2012 | Khlat |
| 8,325,097 | B2 | 12/2012 | McKinzie, III et al. |
| 8,405,563 | B2 | 3/2013 | McKinzie et al. |
| 8,421,548 | B2 | 4/2013 | Spears et al. |
| 8,442,457 | B2 | 5/2013 | Harel et al. |
| 8,457,569 | B2 | 6/2013 | Blin |
| 8,472,888 | B2 * | 6/2013 | Manssen et al. ............ 455/77 |
| 8,558,633 | B2 | 10/2013 | Mckinzie, III |
| 8,564,381 | B2 | 10/2013 | McKinzie |
| 8,594,584 | B2 | 11/2013 | Greene et al. |
| 8,620,236 | B2 | 12/2013 | Manssen et al. |
| 8,620,246 | B2 | 12/2013 | McKinzie et al. |
| 8,620,247 | B2 | 12/2013 | McKinzie et al. |
| 8,655,286 | B2 | 2/2014 | Mendolia |
| 8,674,783 | B2 | 3/2014 | Spears et al. |
| 8,693,963 | B2 | 4/2014 | du Toit et al. |
| 8,787,845 | B2 * | 7/2014 | Manssen et al. ............ 455/77 |
| 2002/0008672 | A1 | 1/2002 | Gothard et al. |
| 2002/0030566 | A1 | 3/2002 | Bozler |
| 2002/0079982 | A1 | 6/2002 | Lafleur et al. |
| 2002/0109642 | A1 | 8/2002 | Gee et al. |
| 2002/0118075 | A1 | 8/2002 | Ohwada |
| 2002/0145483 | A1 | 10/2002 | Bouisse |
| 2002/0167963 | A1 | 11/2002 | Joa-Ng |
| 2002/0183013 | A1 | 12/2002 | Auckland et al. |
| 2002/0187780 | A1 | 12/2002 | Souissi |
| 2002/0191703 | A1 | 12/2002 | Ling |
| 2002/0193088 | A1 | 12/2002 | Jung |
| 2003/0060227 | A1 | 3/2003 | Sekine |
| 2003/0071300 | A1 | 4/2003 | Yashima |
| 2003/0114124 | A1 | 6/2003 | Higuchi |
| 2003/0142022 | A1 | 7/2003 | Ollikainen |
| 2003/0193997 | A1 | 10/2003 | Dent |
| 2003/0199286 | A1 | 10/2003 | D du Toit |
| 2003/0210206 | A1 | 11/2003 | Phillips |
| 2003/0216150 | A1 | 11/2003 | Ueda |
| 2003/0232607 | A1 | 12/2003 | Le Bars |
| 2004/0009754 | A1 | 1/2004 | Smith |
| 2004/0090372 | A1 | 5/2004 | Nallo |
| 2004/0100341 | A1 | 5/2004 | Luetzelschwab |
| 2004/0127178 | A1 | 7/2004 | Kuffner |
| 2004/0137950 | A1 | 7/2004 | Bolin |
| 2004/0202399 | A1 | 10/2004 | Kochergin |
| 2004/0227176 | A1 | 11/2004 | York |
| 2004/0232982 | A1 | 11/2004 | Ichitsubo et al. |
| 2004/0257293 | A1 | 12/2004 | Friedrich |
| 2004/0263411 | A1 | 12/2004 | Fabrega-Sanchez et al. |
| 2005/0007291 | A1 | 1/2005 | Fabrega-Sanchez |
| 2005/0032488 | A1 | 2/2005 | Pehlke |
| 2005/0032541 | A1 | 2/2005 | Wang |
| 2005/0042994 | A1 | 2/2005 | Otaka |
| 2005/0059362 | A1 | 3/2005 | Kalajo |
| 2005/0082636 | A1 | 4/2005 | Yashima |
| 2005/0085204 | A1 | 4/2005 | Poilasne et al. |
| 2005/0093624 | A1 | 5/2005 | Forrester et al. |
| 2005/0130608 | A1 | 6/2005 | Forse |
| 2005/0130699 | A1 | 6/2005 | Kim |
| 2005/0208960 | A1 | 9/2005 | Hassan |
| 2005/0215204 | A1 | 9/2005 | Wallace |
| 2005/0259011 | A1 | 11/2005 | Vance |
| 2005/0264455 | A1 | 12/2005 | Talvitie |
| 2005/0282503 | A1 | 12/2005 | Onno |
| 2006/0003537 | A1 | 1/2006 | Sinha |
| 2006/0009165 | A1 | 1/2006 | Alles |
| 2006/0099915 | A1 | 5/2006 | Laroia et al. |
| 2006/0160501 | A1 | 7/2006 | Mendolia |
| 2006/0183431 | A1 | 8/2006 | Chang et al. |
| 2006/0183433 | A1 | 8/2006 | Mori et al. |
| 2006/0183442 | A1 | 8/2006 | Chang et al. |
| 2006/0195161 | A1 | 8/2006 | Li et al. |
| 2006/0205368 | A1 | 9/2006 | Bustamante |
| 2006/0281423 | A1 | 12/2006 | Caimi |
| 2007/0013483 | A1 | 1/2007 | Stewart |
| 2007/0035458 | A1 | 2/2007 | Ohba |
| 2007/0042725 | A1 | 2/2007 | Poilasne |
| 2007/0042734 | A1 | 2/2007 | Ryu |
| 2007/0063788 | A1 | 3/2007 | Zhu |
| 2007/0080888 | A1 | 4/2007 | Mohamadi |
| 2007/0082611 | A1 | 4/2007 | Terranova et al. |
| 2007/0085609 | A1 | 4/2007 | Itkin |
| 2007/0091006 | A1 | 4/2007 | Thober et al. |

(56) References Cited

U.S. PATENT DOCUMENTS

| | | |
|---|---|---|
| 2007/0111681 A1 | 5/2007 | Alberth et al. |
| 2007/0142011 A1 | 6/2007 | Shatara |
| 2007/0142014 A1 | 6/2007 | Wilcox |
| 2007/0149146 A1 | 6/2007 | Hwang |
| 2007/0171879 A1 | 7/2007 | Bourque |
| 2007/0182636 A1 | 8/2007 | Carlson |
| 2007/0184825 A1 | 8/2007 | Lim et al. |
| 2007/0194859 A1 | 8/2007 | Brobston |
| 2007/0197180 A1 | 8/2007 | McKinzie et al. |
| 2007/0200766 A1 | 8/2007 | McKinzie |
| 2007/0200773 A1 | 8/2007 | Dou et al. |
| 2007/0285326 A1 | 12/2007 | McKinzie |
| 2007/0293176 A1 | 12/2007 | Yu |
| 2008/0007478 A1 | 1/2008 | Jung |
| 2008/0018541 A1 | 1/2008 | Pang |
| 2008/0055016 A1 | 3/2008 | Morris |
| 2008/0081670 A1 | 4/2008 | Rofougaran |
| 2008/0090539 A1 | 4/2008 | Thompson |
| 2008/0094149 A1 | 4/2008 | Brobston |
| 2008/0106350 A1 | 5/2008 | McKinzie |
| 2008/0122553 A1 | 5/2008 | McKinzie |
| 2008/0122723 A1 | 5/2008 | Rofougaran |
| 2008/0129612 A1 | 6/2008 | Wang |
| 2008/0158076 A1 | 7/2008 | Walley |
| 2008/0261544 A1 | 10/2008 | Blin |
| 2008/0274706 A1 | 11/2008 | Blin |
| 2008/0280570 A1 | 11/2008 | Blin |
| 2008/0285729 A1 | 11/2008 | Glasgow et al. |
| 2008/0294718 A1 | 11/2008 | Okano |
| 2008/0300027 A1 | 12/2008 | Dou et al. |
| 2008/0305749 A1 | 12/2008 | Ben-Bassat |
| 2008/0305750 A1 | 12/2008 | Alon et al. |
| 2008/0309617 A1 | 12/2008 | Kong et al. |
| 2009/0002077 A1 | 1/2009 | Rohani et al. |
| 2009/0027286 A1 | 1/2009 | Ohishi |
| 2009/0082017 A1 | 3/2009 | Chang et al. |
| 2009/0109880 A1 | 4/2009 | Kim et al. |
| 2009/0121963 A1 | 5/2009 | Greene |
| 2009/0149136 A1 | 6/2009 | Rofougaran |
| 2009/0180403 A1 | 7/2009 | Tudosoiu |
| 2009/0184879 A1 | 7/2009 | Derneryd |
| 2009/0215446 A1 | 8/2009 | Hapsari et al. |
| 2009/0231220 A1 | 9/2009 | Zhang et al. |
| 2009/0253385 A1 | 10/2009 | Dent et al. |
| 2009/0264065 A1 | 10/2009 | Song |
| 2009/0278685 A1 | 11/2009 | Potyrailo |
| 2009/0295651 A1 | 12/2009 | Dou et al. |
| 2009/0323572 A1 | 12/2009 | Shi et al. |
| 2009/0323582 A1 | 12/2009 | Proctor et al. |
| 2010/0041348 A1 | 2/2010 | Wilcox et al. |
| 2010/0053009 A1 | 3/2010 | Rofougaran |
| 2010/0060531 A1 | 3/2010 | Rappaport |
| 2010/0073103 A1 | 3/2010 | Spears et al. |
| 2010/0085260 A1 | 4/2010 | McKinzie |
| 2010/0085884 A1 | 4/2010 | Srinivasan et al. |
| 2010/0105425 A1 | 4/2010 | Asokan |
| 2010/0156552 A1 | 6/2010 | McKinzie |
| 2010/0164640 A1 | 7/2010 | McKinzie |
| 2010/0164641 A1 | 7/2010 | McKinzie |
| 2010/0232474 A1 | 9/2010 | Rofougaran et al. |
| 2010/0244576 A1 | 9/2010 | Hillan et al. |
| 2010/0285836 A1 | 11/2010 | Horihata et al. |
| 2010/0302106 A1 | 12/2010 | Knudsen et al. |
| 2010/0304688 A1 | 12/2010 | Knudsen |
| 2011/0002080 A1 | 1/2011 | Ranta |
| 2011/0012790 A1 | 1/2011 | Badaruzzaman |
| 2011/0014879 A1 | 1/2011 | Alberth et al. |
| 2011/0014886 A1 | 1/2011 | Manssen |
| 2011/0043298 A1 | 2/2011 | McKinzie |
| 2011/0043328 A1 | 2/2011 | Bassali |
| 2011/0053524 A1 | 3/2011 | Manssen |
| 2011/0063042 A1 | 3/2011 | Mendolia |
| 2011/0086600 A1 | 4/2011 | Muhammad |
| 2011/0086630 A1 | 4/2011 | Manssen |
| 2010/0105023 A1 | 5/2011 | Scheer et al. |
| 2011/0102290 A1 | 5/2011 | Milosavljevic |
| 2011/0116423 A1 | 5/2011 | Rousu et al. |
| 2011/0117863 A1 | 5/2011 | Camp, Jr. et al. |
| 2011/0117973 A1 | 5/2011 | Asrani et al. |
| 2011/0121079 A1 | 5/2011 | Lawrence et al. |
| 2011/0133994 A1 | 6/2011 | Korva |
| 2011/0140982 A1 | 6/2011 | Ozden et al. |
| 2011/0183628 A1 | 7/2011 | Baker |
| 2011/0183633 A1 | 7/2011 | Ohba et al. |
| 2011/0195679 A1 | 8/2011 | Lee et al. |
| 2011/0227666 A1 | 9/2011 | Manssen |
| 2011/0237207 A1 | 9/2011 | Bauder |
| 2011/0249760 A1 | 10/2011 | Chrisikos et al. |
| 2011/0250852 A1 | 10/2011 | Greene |
| 2011/0254637 A1 | 10/2011 | Manssen |
| 2011/0254638 A1 | 10/2011 | Manssen |
| 2011/0256857 A1 | 10/2011 | Chen et al. |
| 2011/0281532 A1 | 11/2011 | Shin et al. |
| 2011/0299438 A1 | 12/2011 | Mikhemar |
| 2012/0051409 A1 | 3/2012 | Brobston et al. |
| 2012/0075159 A1 | 3/2012 | Chang |
| 2012/0084537 A1 | 4/2012 | Indukuru |
| 2012/0094708 A1 | 4/2012 | Park |
| 2012/0100802 A1 | 4/2012 | Mohebbi |
| 2012/0112851 A1 | 5/2012 | Manssen |
| 2012/0112852 A1 | 5/2012 | Manssen et al. |
| 2012/0119843 A1 | 5/2012 | du Toit et al. |
| 2012/0119844 A1 | 5/2012 | du Toit et al. |
| 2012/0154975 A1 | 6/2012 | Oakes |
| 2012/0214421 A1 | 8/2012 | Hoirup |
| 2012/0220243 A1 | 8/2012 | Mendolia |
| 2012/0243579 A1 | 9/2012 | Premakanthan et al. |
| 2012/0286586 A1 | 11/2012 | Balm |
| 2012/0293384 A1 | 11/2012 | Knudsen et al. |
| 2012/0295554 A1 | 11/2012 | Greene |
| 2012/0295555 A1 | 11/2012 | Greene et al. |
| 2013/0005277 A1 | 1/2013 | Klomsdorf et al. |
| 2013/0052967 A1 | 2/2013 | Black et al. |
| 2013/0106332 A1 | 5/2013 | Williams et al. |
| 2013/0122829 A1 | 5/2013 | Hyvonen et al. |
| 2013/0137384 A1 | 5/2013 | Desclos et al. |
| 2013/0215846 A1 | 8/2013 | Yerrabommanahalli et al. |
| 2013/0315285 A1 | 11/2013 | Black et al. |
| 2014/0002323 A1 | 1/2014 | Ali et al. |

FOREIGN PATENT DOCUMENTS

| | | |
|---|---|---|
| DE | 102008050743 | 4/2010 |
| DE | 102009018648 A1 | 10/2010 |
| EM | EP0909024 | 4/1999 |
| EP | 0685936 | 6/1995 |
| EP | 0909024 | 4/1999 |
| EP | 1079296 | 2/2001 |
| EP | 1137192 | 9/2001 |
| EP | 1298810 | 4/2006 |
| EP | 2328233 | 6/2011 |
| EP | 2388925 A1 | 11/2011 |
| EP | 2424119 A1 | 2/2012 |
| JP | 03276901 | 3/1990 |
| JP | 02-077580 | 9/1991 |
| JP | 9321526 | 12/1997 |
| JP | 10209722 | 8/1998 |
| JP | 200012066 | 4/2000 |
| KR | 100645526 | 11/2006 |
| KR | 10-0740177 | 7/2007 |
| WO | 01/71846 | 9/2001 |
| WO | 2006/031170 | 3/2006 |
| WO | 2008/030165 | 3/2008 |
| WO | 2009/064968 | 5/2009 |
| WO | 2009/155966 | 12/2009 |
| WO | 2011/044592 | 4/2011 |
| WO | 2011/084716 | 7/2011 |
| WO | 2011028453 | 10/2011 |
| WO | 2011133657 | 10/2011 |

(56) References Cited

FOREIGN PATENT DOCUMENTS

| WO | 2012/067622 | 5/2012 |
|---|---|---|
| WO | 2012/085932 | 6/2012 |

OTHER PUBLICATIONS

Du Toit, , "Tunable Microwave Devices With Auto Adjusting Matching Circuit", U.S. Appl. No. 13/302,617, filed Nov. 22, 2011.
Du Toit, , "Tunable Microwave Devices With Auto-Adjusting Matching Circuit", U.S. Appl. No. 13/302,649, filed Nov. 22, 2011.
Eiji, N. , "High-Frequency Circuit and Its Manufacture", Patent Abstracts of Japan, vol. 1998, No. 13, Nov. 30, 1998 & JP 10 209722 A (Seiko Epson Corp), Aug. 7, 1998.
Greene, , "Method and Apparatus for Tuning a Communication Device", U.S. Appl. No. 13/108,463, filed May 16, 2011.
Greene, , "Method and Apparatus for Tuning a Communication Device", U.S. Appl. No. 13/108,589, filed May 16, 2011.
Hoirup, , "Method and Apparatus for Radio Antenna Frequency Tuning", U.S. Appl. No. 13/030,177, filed Feb. 18, 2011.
Huang, Libo et al., "Theoretical and experimental investigation of adaptive antenna impedance matching for multiband mobile phone applications", IEEE, Sep. 7, 2005, 13-17.
Hyun, S. , "Effects of strain on the dielectric properties of tunable dielectric SrTi03 thin films", Applied Physics Letters, vol. 79, No. 2, Jul. 9, 2001.
Ida, I. et al., "An Adaptive Impedence Matching System and Its Application to Mobile Antennas", TENCON 2004, IEEE Region 10 Conference, See Abstract ad p. 544, Nov. 21-24, 2004, 543-547.
Katsuya, K. , "Hybrid Integrated Circuit Device", Patent Abstracts of Japan, Publication No. 03-276901, Date of publication of application: Sep. 12, 1991.
Manssen, "Method and Apparatus for Managing Interference in a Communication Device", U.S. Appl. No. 61/326,206, filed Apr. 20, 2010.
Manssen, "Method and Apparatus for Tuning Antennas in a Communication Device", U.S. Appl. No. 12/941,972, filed Nov. 8, 2010.
Manssen, "Method and Apparatus for Tuning Antennas in a Communication Device", U.S. Appl. No. 13/005,122, filed Jan. 12, 2011.
McKinzie, "Adaptive Impedance Matching Module (AIMM) Control Architectures", U.S. Appl. No. 13/293,544, filed Nov. 10, 2011.
McKinzie, , "Adaptive Impedance Matching Module (AIMM) Control Architecture", U.S. Appl. No. 13/293,550, filed Nov. 10, 2011.
McKinzie, , "Method and Apparatus for Adaptive Impedance Matching", U.S. Appl. No. 13/217,748, filed Aug. 25, 2011.
Mendolia, , "Method and Apparatus for Tuning a Communication Device", U.S. Appl. No. 13/035,417, filed Feb. 25, 2011.
Paratek Microwave, Inc., , "Method and Apparatus for Tuning Antennas in a Communication Device", International Application No. PCT/US11/59620, filed Nov. 7, 2011.
Patent Cooperation Treaty, , "International Search Report and Written Opinion", International Application No. PCT/US2010/046241, Mar. 2, 2011.
Patent Cooperation Treaty, , "International Search Report and Written Opinion", International Application No. PCT/US2010/056413, Jul. 27, 2011.
Patent Cooperation Treaty, , "International Search Report and Written Opinion", Nov. 16, 2011, International Application No. PCT/US/2011/038543.
Patent Cooperation Treaty, , "International Search Report and Written Opinion", PCT Application No. PCT/US08/005085, Jul. 2, 2008.
Pervez, N.K. , "High Tunability barium strontium titanate thin films for RF circuit applications", Applied Physics Letters, vol. 85, No. 19, Nov. 8, 2004.
Petit, Laurent , "MEMS-Switched Parasitic-Antenna Array for Radiation Pattern Diversity", IEEE Transactions on Antennas and Propagation, vol. 54, No. 9, Sep. 2009, 2624-2631.
Qiao, et al., "Antenna Impedance Mismatch Measurement and Correction for Adaptive COMA Transceivers", IEEE, Jan. 2005.
Qiao, et al., "Measurement of Antenna Load Impedance for Power Amplifiers", The Department of Electrical and Computer Engineering, University of California, San Diego, Sep. 13, 2004.
Spears, , "Methods for Tuning an Adaptive Impedance Matching Network With a Look-Up Table", U.S. Appl. No. 13/297,951, filed Nov. 16, 2011.
Stemmer, Susanne , "Low-loss tunable capacitors fabricated directly on gold bottom electrodes", Applied Physics Letters 88, 112905, Mar. 15, 2006.
Taylor, T.R. , "Impact of thermal strain on the dielectric constant of sputtered barium strontium titanate thin films", Applied Physics Letters, vol. 80, No. 11, Mar. 18, 2002.
Tombak, Ali , "Tunable Barium Strontium Titanate Thin Film Capacitors for RF and Microwave Applications", IEEE Microwave and Wireles Components Letters, vol. 12, Jan. 2002.
Xu, Hongtao , "Tunable Microwave Integrated Circuits using BST Thin Film Capacitors with Device", Integrated Ferroelectrics, Department of Electrical Engineering and Computer Engineering, University of California, 2005, Apr. 2005.
Zuo, S. , "Eigenmode Decoupling for Mimo Loop-Antenna Based on 180 Coupler", Progress in Electromagnetics Research Letters, vol. 26, Aug. 2011, 11-20.

\* cited by examiner

LOOK-UP TABLE

| |
|---|
| Band 1; Use Case 1; Desired tuning state |
| Band 1; Use Case 2; Desired tuning state |
| ⋮ |
| Band 1; Use Case n; Desired tuning state |
| Band 2; Use Case 1; Desired tuning state |
| Band 2; Use Case 2; Desired tuning state |
| ⋮ |
| Band 2; Use Case n; Desired tuning state |
| Band N; Use Case 1; Desired tuning state |
| Band N; Use Case 2; Desired tuning state |
| ⋮ |
| Band N; Use Case n; Desired tuning state |

METHOD AND APPARATUS FOR CALIBRATING A COMMUNICATION DEVICE

CROSS-REFERENCE TO RELATED APPLICATIONS

This application is a Continuation of and claims priority to U.S. patent application Ser. No. 13/904,321 filed May. 29, 2013, which is a Continuation of and claims priority to U.S. patent application Ser. No. 12/547,411 filed Aug. 25, 2009 now U.S. Pat. No. 8,472,888, the contents of each of the foregoing are hereby incorporated by reference into this application as if set forth herein in full.

FIELD OF THE DISCLOSURE

The present disclosure relates generally to calibration techniques, and more specifically to a method and apparatus for calibrating a communication device.

BACKGROUND

Existing multi-frequency wireless devices (e.g., radios) use an antenna structure that attempts to radiate at optimum efficiency over the entire frequency range of operation, but can really only do so over a subset of the frequencies. Due to size constraints, and aesthetic design reasons, the antenna designer is forced to compromise the performance in some of the frequency bands. An example of such a wireless device could be a mobile telephone that operates over a range of different frequencies, such as 800 MHz to 2200 MHz. The antenna will not radiate efficiently at all frequencies due to the nature of the design, and the power transfer between the antenna, the power amplifier, and the receiver in the radio will vary significantly.

Additionally, an antenna's performance is impacted by its operating environment. For example, multiple use cases exist for radio handsets, which include such conditions as the placement of the handset's antenna next to a user's head, or in the user's pocket or the covering of an antenna with a hand, which can significantly impair wireless device efficiency.

Further, many existing radios use a simple circuit composed of fixed value components that are aimed at improving the power transfer from power amplifier to antenna, or from the antenna to the receiver, but since the components used are fixed in value there is always a compromise when attempting to cover multiple frequency bands and multiple use cases.

DETAILED DESCRIPTION

One embodiment of the present disclosure entails a method to select a subset of tuning states of a tunable matching network operable in a communication device, wherein the tunable matching network has a tunable reactance that affects one or more performance parameters of the communication device, perform actual measurements of the one or more performance parameters of the communication device according to the subset of tuning states, determine estimated measurements of the one or more performance parameters for a portion of the tuning states not included in the subset of tuning states according to the actual measurements of the one or more performance parameters, identify a data set for each of the one or more performance parameters from the tuning states and the actual and estimated measurements, recognize one or more desirable performance characteristics of the communication device, and determine from at least a portion of the one or more data sets one or more tuning states of the tunable matching network that achieves the one or more desirable performance characteristics of the communication device.

One embodiment of the present disclosure entails a computer-readable storage medium having computer instructions to perform actual measurements of one or more performance parameters of a communication device according to a subset of tuning states of a tunable matching network operable in a communication device, determine estimated measurements of the one or more performance parameters of the communication device for a portion of the tuning states not included in the subset of tuning states according to the actual measurements, identify a data set for each of the one or more performance parameters from at least portions of the tuning states and the actual and estimated measurements, and determine from at least a portion of the date sets one or more tuning states that achieve at least one desirable performance characteristic of the communication device.

One embodiment of the present disclosure entails a method to distribute a software application by way of an electronic system. The software application can be operable to perform actual measurements of one or more performance parameters of a communication device according to a subset of tuning states of a tunable reactive element of a communication device, estimate measurements of the of the one or more performance parameters for a portion of the tuning states not included in the subset of tuning states according to at least portions of the actual measurements, and determine a multi-dimensional data set for each of the one or more performance parameters from at least portions of the tuning states and the actual and estimated measurements.

One embodiment of the present disclosure entails a tunable matching network useable in a communication device having a tunable reactive element tuned according to a look-up table. The look-up table can have tuning states that achieve at least one desirable performance characteristic of the communication device. The tuning states can be determined according to a method to perform actual measurements of one or more performance parameters of the communication device according to a subset of tuning states of the tunable reactive element, determine estimated measurements of the one or more performance parameters of the communication device for a portion of the tuning states not included in the subset of tuning states according to the actual measurements, identify a data set for each of the one or more performance parameters from at least portions of the tuning states and the actual and estimated measurements, and determine from at least a portion of the date sets the tuning states that achieve the at least one desirable performance characteristic of the communication device.

Figure 1:
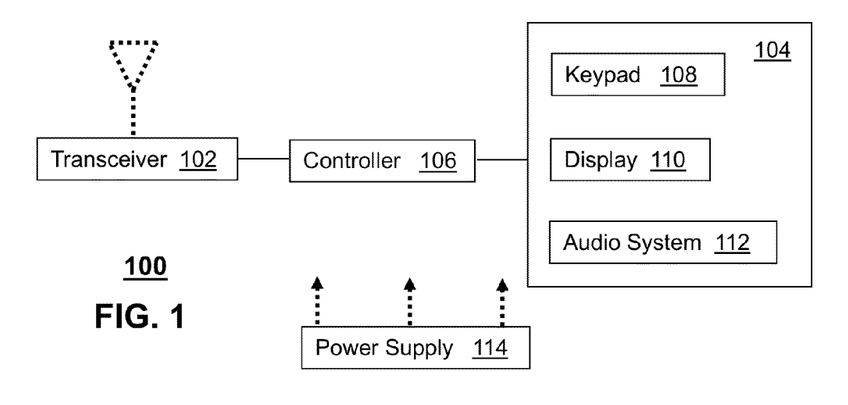
FIG. 1 depicts an illustrative embodiment of a communication device.

FIG. 1 depicts an exemplary embodiment of a communication device 100. The communication device 100 can comprise a wireless transceiver 102 (herein having independent transmit and receiver sections, a user interface (UI) 104, a power supply 114, and a controller 106 for managing operations thereof. The wireless transceiver 102 can utilize short-range or long-range wireless access technologies such as Bluetooth, WiFi, Digital Enhanced Cordless Telecommunications (DECT), or cellular communication technologies, just to mention a few. Cellular technologies can include, for example, CDMA-1X, WCDMA, UMTS/HSDPA, GSM/GPRS, TDMA/EDGE, EV/DO, WiMAX, and next generation cellular wireless communication technologies as they arise.

The UI 104 can include a depressible or touch-sensitive keypad 108 with a navigation mechanism such as a roller ball, joystick, mouse, or navigation disk for manipulating operations of the communication device 100. The keypad 108 can be an integral part of a housing assembly of the communication device 100 or an independent device operably coupled thereto by a tethered wireline interface (such as a flex cable) or a wireless interface supporting for example Bluetooth. The keypad 108 can represent a numeric dialing keypad commonly used by phones, and/or a Qwerty keypad with alpha-numeric keys. The UI 104 can further include a display 110 such as monochrome or color LCD (Liquid Crystal Display), OLED (Organic Light Emitting Diode) or other suitable display technology for conveying images to an end user of the communication device 100. In an embodiment where the display 110 is a touch-sensitive display, a portion or all of the keypad 108 can be presented by way of the display.

The power supply 114 can utilize common power management technologies (such as replaceable batteries, supply regulation technologies, and charging system technologies) for supplying energy to the components of the communication device 100 to facilitate portable applications. The controller 106 can utilize computing technologies such as a microprocessor and/or digital signal processor (DSP) with associated storage memory such a Flash, ROM, RAM, SRAM, DRAM or other like technologies.

Figure 2:
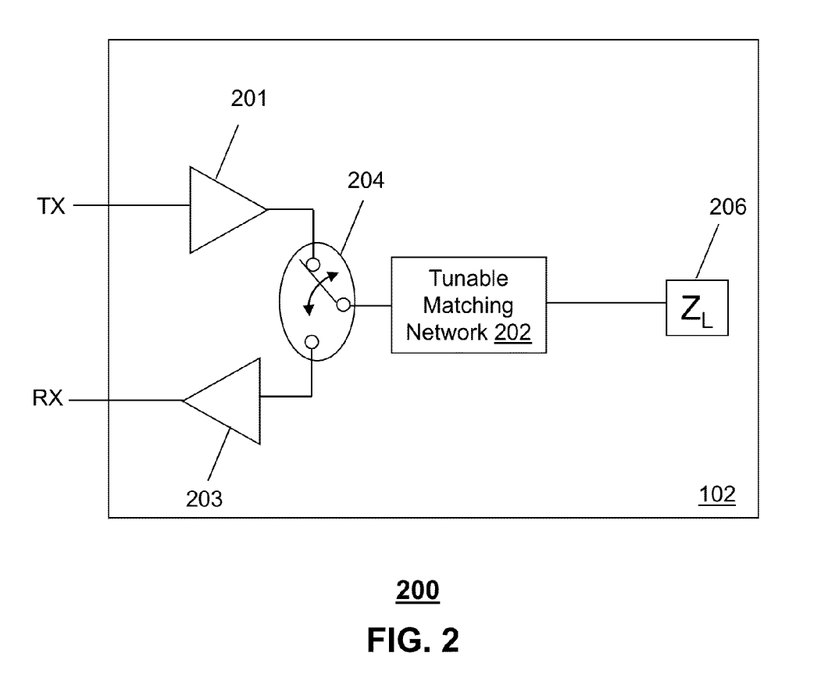
FIG. 2 depicts an illustrative embodiment of a portion of a transceiver of the communication device of FIG. 1.

FIG. 2 depicts an illustrative embodiment of a portion of the wireless transceiver 102 of the communication device 100 of FIG. 1. In GSM applications, the transmit and receive portions of the transceiver 102 can include common amplifiers 201, 203 coupled to a tunable matching network 202 and an impedance load 206 by way of a switch 204. The load 206 in the present illustration can an antenna as shown in FIG. 1 (herein antenna 206). A transmit signal in the form of a radio frequency (RF) signal (TX) can be directed to the amplifier 201 which amplifies the signal and directs the amplified signal to the antenna 206 by way of the tunable matching network 202 when switch 204 is enabled for a transmission session. The receive portion of the transceiver 102 can utilize a pre-amplifier 203 which amplifies signals received from the antenna 206 by way of the tunable matching network 202 when switch 204 is enabled for a receive session. Other configurations of FIG. 2 are possible for other types of cellular access technologies such as CDMA. These undisclosed configurations are contemplated by the present disclosure.

Figure 3:
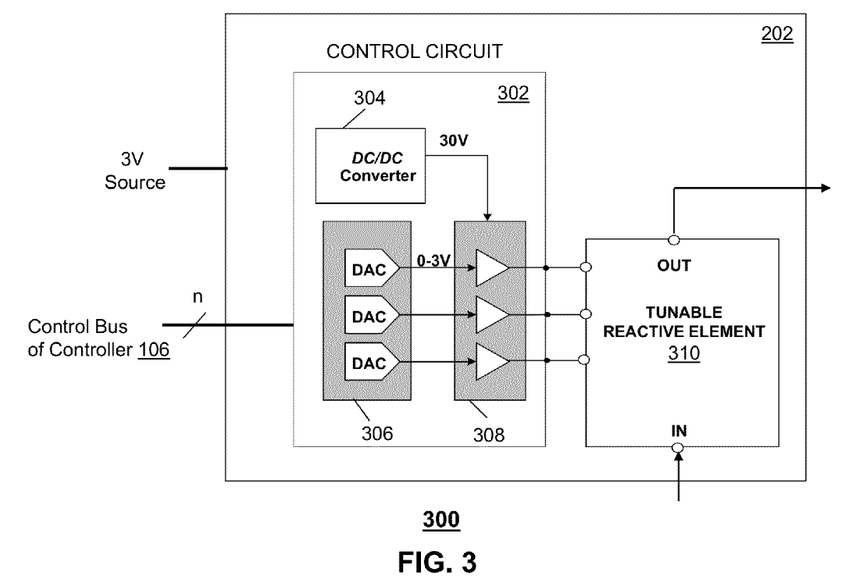
FIGS. 3-4 depict illustrative embodiments of a tunable matching network of the transceiver of FIG. 2.
Figure 4:
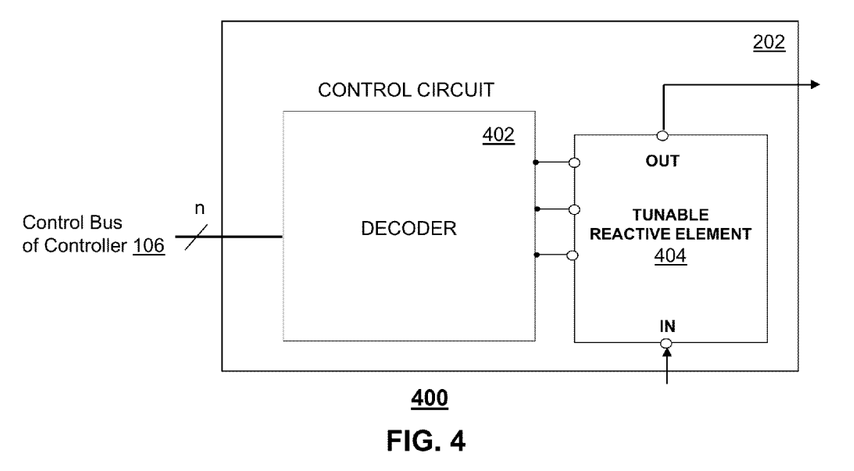
Figure 5:
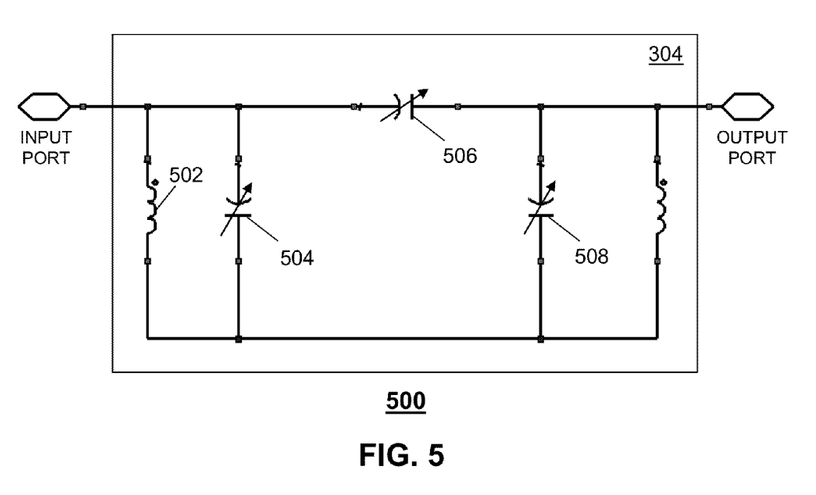
FIGS. 5-6 depict illustrative embodiments of a tunable reactive element of the tunable matching network.

FIGS. 3-4 depict illustrative embodiments of the tunable matching network 202 of the transceiver 102 of FIG. 2. In one embodiment, the tunable matching network 202 can comprise a control circuit 302 and a tunable reactive element 310. The control circuit 302 can comprise a DC-to-DC converter 304, one or more digital to analog converters (DACs) 306 and one or more corresponding buffers 308 to amplify the voltage generated by each DAC. The amplified signal can be fed to one or more tunable reactive components 504, 506 and 508 such as shown in FIG. 5, which depicts a possible circuit configuration for the tunable reactive element 310. In this illustration, the tunable reactive element 310 includes three tunable capacitors 504-508 and an inductor 502 with a fixed inductance. Other circuit configurations are possible, and thereby contemplated by the present disclosure.

The tunable capacitors 504-508 can each utilize technology that enables tunability of the capacitance of said component. One embodiment of the tunable capacitors 504-508 can utilize voltage or current tunable dielectric materials such as a composition of barium strontium titanate (BST). An illustration of a BST composition is the Parascan® Tunable Capacitor. In another embodiment, the tunable reactive element 310 can utilize semiconductor varactors. Other present or next generation methods or material compositions that can support a means for a voltage or current tunable reactive element are contemplated by the present disclosure.

The DC-to-DC converter 304 can receive a power signal such as 3 Volts from the power supply 114 of the communication device 100 in FIG. 1. The DC-to-DC converter 304 can use common technology to amplify this power signal to a higher range (e.g., 30 Volts) such as shown. The controller 106 can supply digital signals to each of the DACs 306 by way of a control bus of "n" or more wires to individually control the capacitance of tunable capacitors 504-508, thereby varying the collective reactance of the tunable matching network 202. The control bus can be implemented with a two-wire common serial communications technology such as a Serial Peripheral Interface (SPI) bus. With an SPI bus, the controller 106 can submit serialized digital signals to configure each DAC in FIG. 3 or the switches of the tunable reactive element 404 of FIG. 4. The control circuit 302 of FIG. 3 can utilize common digital logic to implement the SPI bus and to direct digital signals supplied by the controller 106 to the DACs.

Figure 6:
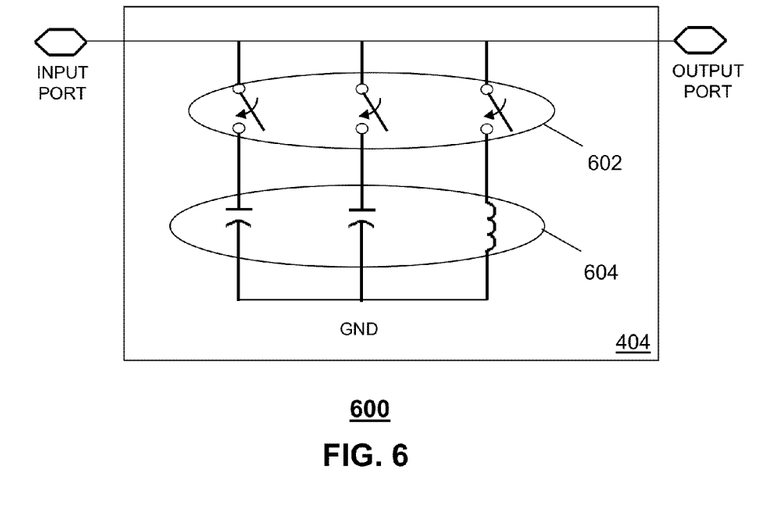

In another embodiment, the tunable matching network 202 can comprise a control circuit 402 in the form of a decoder and a tunable reactive element 404 comprising switchable reactive elements such as shown in FIG. 6. In this embodiment, the controller 106 can supply the control circuit 402 signals via the SPI bus which can be decoded with common Boolean or state machine logic to individually enable or disable the switching elements 602. The switching elements 602 can be implemented with semiconductor switches or micro-machined switches such as utilized in micro-electromechanical systems (MEMS). By independently enabling and disabling the reactive elements (capacitor or inductor) of FIG. 6 with the switching elements 602, the collective reactance of the tunable reactive element 404 can be varied.

Figure 7:
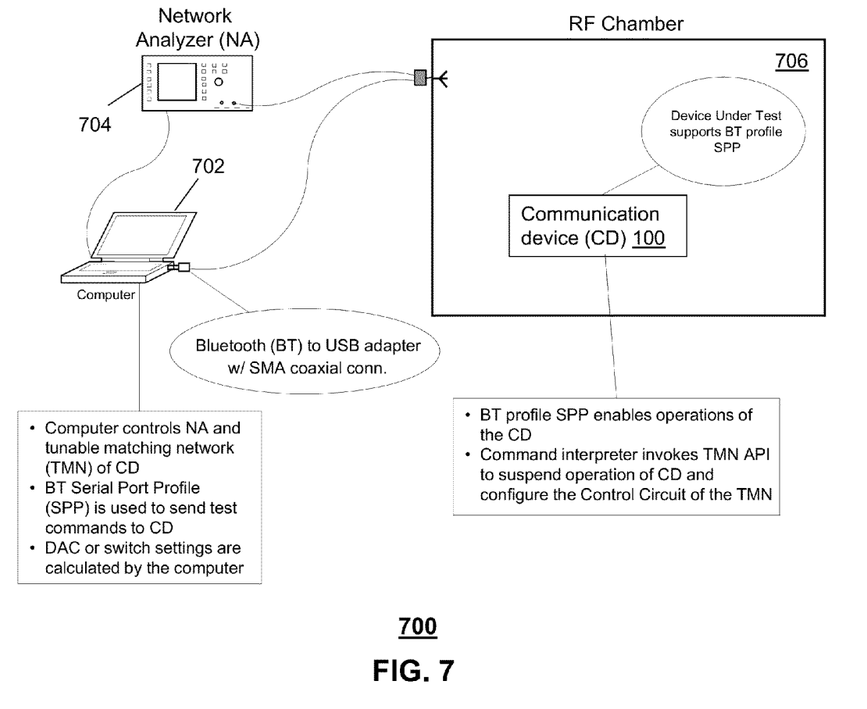
FIG. 7 depicts an illustrative embodiment of a test environment for configuring the communication device of FIG. 1.

The tunability of the tunable matching networks 202, 204 provides the controller 106 a means to optimize performance parameters of the transceiver 102 such as, for example, but not limited to, transmitter power, transmitter efficiency, receiver sensitivity, power consumption of the communication device, a specific absorption rate (SAR) of energy by a human body, frequency band performance parameters, and so on. To achieve one or more desirable performance characteristics which a designer can define, the communication device 100 can be placed in an anechoic chamber 706 such as depicted by FIG. 7. In this configuration, the designer can perform calibration measurements of performance parameters of the communication device 100 such as Total Radiated Power (TRP), Total Isotropic Sensitivity (TIS) or Radiated Harmonics measurements, receiver efficiency, transmit power efficiency, and power consumption, just to mention a few. For a multi-frequency band communication device 100, the calibration measurements can be performed per band or per sub-band.

Additionally, the calibration measurements can be performed under a number of use cases of the communication device 100 utilizing a phantom body that emulates the composition of a human body. For instance, a communication device 100 having a housing assembly of a flip design, the communication device 100 can be placed next to an ear of the phantom when the flip is open to emulate a typical conversational use case. In a hands-free application such when a user utilizes a Bluetooth headset or when the communication device 100 is in standby mode, the communication device 100 can be placed on a hip of the phantom with the flip closed. Calibration can be performed on other use cases such as antenna up, or down, speakerphone feature "ON" with communication device 100 held with a phantom hand but away from the phantom head. Any number of use cases can be applied to each frequency band and sub-band if desirable.

As depicted in FIG. 7, a computer 702 can be communicatively coupled to the communication device 100 located in the anechoic chamber by way of a Bluetooth to USB adapter with coaxial connection. The computer 702 can also be communicatively coupled to a communications system analyzer 704 (which can place and receive active "phone calls" to a cellular handset) which is also connected to the anechoic chamber by way of coaxial cable connection. The computer 702 can control the communications system analyzer 704 and the tunable matching network 202 of FIG. 2. Control of the communication device 100 can conform to a Bluetooth Serial Port Profile (SPP) which provides the computer 702 a means to send test commands, control DAC settings, or switch settings by way of control circuits 302 or 402 of FIG. 3 or 4. Although not shown, the calibration environment of FIG. 7 can include additional test equipment that can measure power consumption of the communication device 100, SAR, harmonics or other useful performance parameters. Accordingly, any measurable performance parameter of the communication device 100 is contemplated by the present disclosure.

Figure 8:
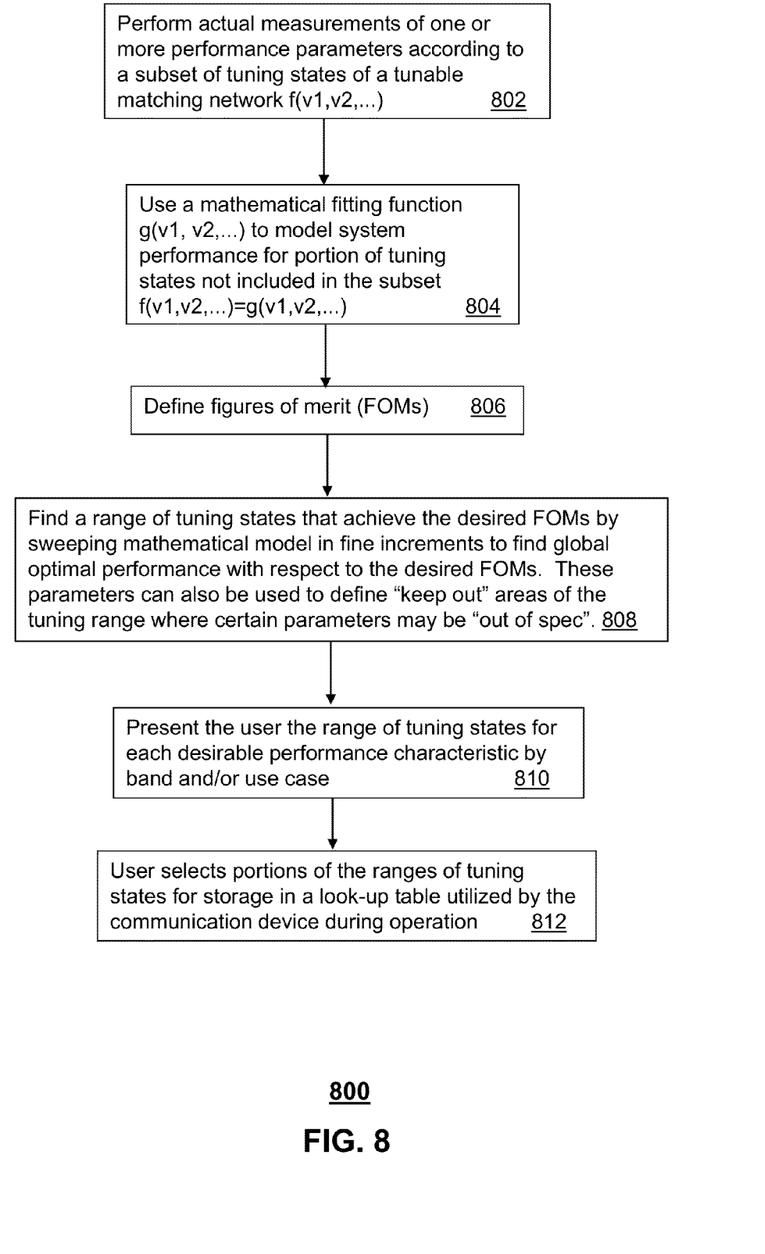
FIG. 8 depicts an exemplary method operating in portions of the test environment of FIG. 7.

FIG. 8 depicts an exemplary method 800 operating in portions of the test environment of FIG. 7. Method 800 can begin with the computer 702 directing the operations of the communication device 100 and the configuration of the tunable matching network 202 to perform actual measurements of one or more performance parameters (e.g., TX power, RX sensitivity via received signal strength indication or RSSI, power consumption, and so on) of the communication device 100. Suppose for instance that tunable matching network 202 includes three DACs each having thirty-two configurable output voltages ranging from 0 to 3 Volts as shown in FIG. 3. Three DACs would provide 32,768 (32*32*32) combination of voltages which can be supplied to the three tunable capacitors 504-508 of FIG. 5. Assume further that the transceiver 102 supports 4 bands for world travel, and the designer of the communication device 100 would like to test 3 use cases per band. Under these conditions, the designer would have to perform 393,216 calibration measurements for each performance parameter of interest, which could lead to millions of measurements.

Step 802, however, can be adapted to perform a subset of the possible tuning states of the DACs 306. For example, the computer 702 can be adapted to perform calibration measurements for five tuning states of each DAC. Under these constraints, the calibration measurements can be limited to 125 (5*5*5) calibration measurements for each performance parameter of interest. If one includes 4 bands and 3 use cases, then the total calibration measurements can amount to 1500 measurements, which is obviously substantially less than a full sweep of calibration measurements.

Figure 9:
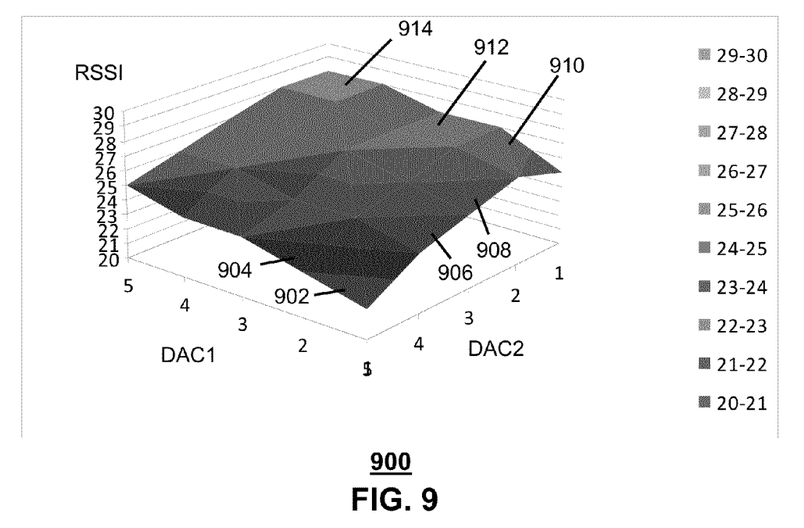
FIGS. 9-12 depict illustrative embodiments of data sets before and after an application of a smoothing function.

For illustration purposes only, the tuning matching network 202 as depicted in FIG. 3 will be assumed to have only two DACs, each capable of 20 tunable levels. It is further assumed that a subset of 5 tuning states is used for step 802. With this in mind, FIG. 9 depicts a data set of 25 calibration measurements of receive sensitivity data based on RSSI measurements. The graph of FIG. 9 illustrates 1 dB contour bands. As should be evident from FIG. 9, contour bands 902-914 are not smooth. The jagged bands occur for two reasons. First, the RSSI data points are inaccurate because the communication device 100 can only provide non-fractional RSSI data. Second, the missing tuning states create a step effect which creates additional jagged edges between contour bands.

In step 804, the computer 702 can be adapted to apply a common mathematical fitting function $g(v1, v2, ...)$ to model system performance for the portion of tuning states not included in the subset of step 802. The fitting function can also reduce inaccuracies in the RSSI data. The fitting function can be a $3^{rd}$ or $4^{th}$ order function that utilizes a common regression algorithm to interpolate between the actual measurements derived from step 802. For illustration purposes, what follows is a sample $3^{rd}$ order fitting function:

$$c1+c2x+c3y+c4x^2+c5y^2+c6xy+c7xy^2+c8x^2y+c9x^3+c10y^3$$

Figure 10:
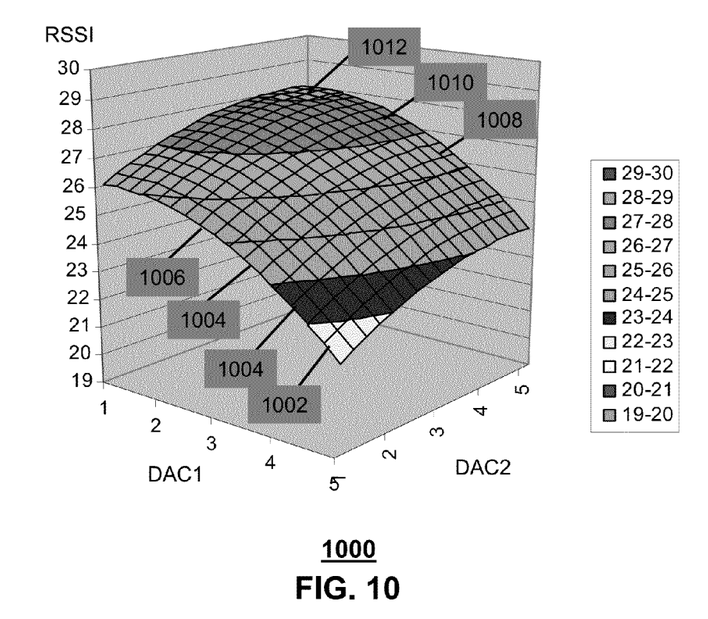

Constants c1-c10 can be adapted through an iterative process to perform a third order fitting function. Other fitting functions are contemplated by the present disclosure. FIG. 10 depicts the result of applying the fitting function to the RSSI data set of FIG. 9. As should be evident from FIG. 10, the 1 dB contour bands 1002-1012 have been substantially smoothed to more accurately reflect the actual RSSI measurements and to estimate the RSSI measurements which would have been measured for the tuning states of the DACs 1 and 2 which were not included in the subset of step 802.

Figure 11:
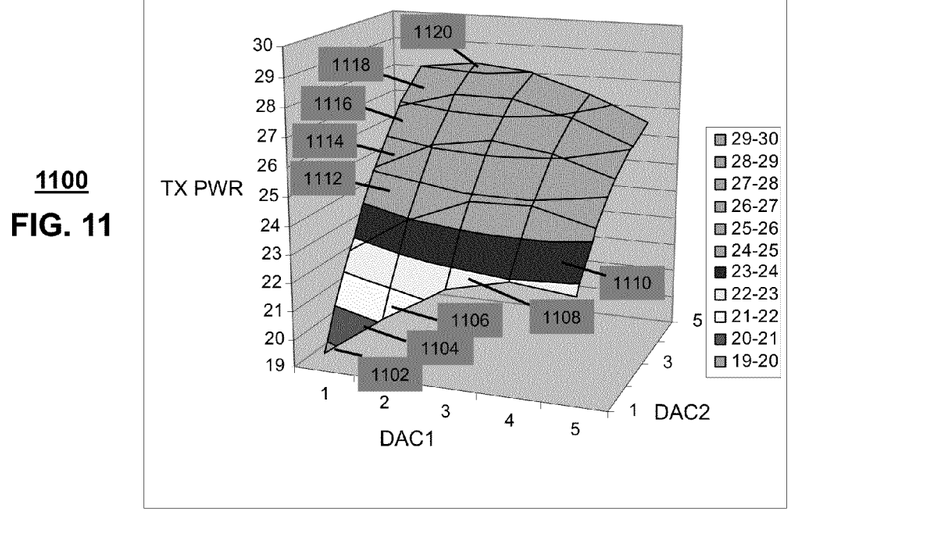
Figure 12:
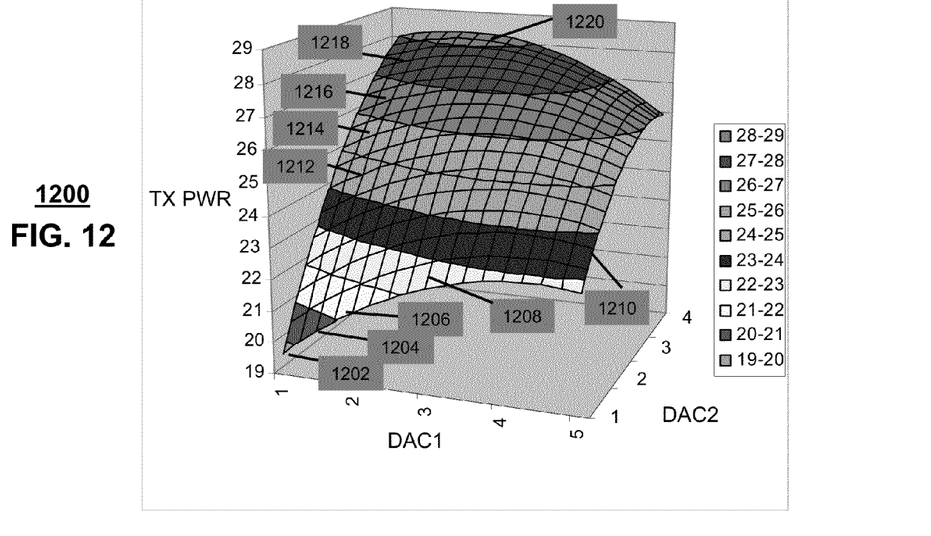

FIG. 11 depicts an illustration of a data set for transmit power measurements performed with the subset of tuning states used in step 802. The 1 dB contour bands 1102-1120 for this illustration are less jagged than the contour bands 902-914 of FIG. 9 because the TX power measurement is derived from the network analyzer which can provide fractional results to the computer 702. FIG. 12 depicts the data set resulting from the application of the above fitting function in step 804. As should be evident in this illustration, the fitting function generates smoother contour bands 1202-1220 when compared to the contour bands 1102-1120 of FIG. 11.

Once the data sets for each performance parameter (e.g., RX sensitivity, TX power, etc.) have been fitted in step 804 over the entire tuning states of DACs 1 and 2, the computer 702 can be adapted with computer software to proceed to step 806 where it can present the designer of the communication device 100 options to define desired figures of merit (FOMs) which can be used to determine tuning states that provide optimal solutions for the desired FOMs. An FOM can represent, for example, a desired power transmit efficiency (TX power over battery power drain). FOMs can also represent "keep out" areas where optimal performance may not be desirable. FOMs can also mathematically combine performance parameters (e.g., TX power+RX power).

Figure 13:
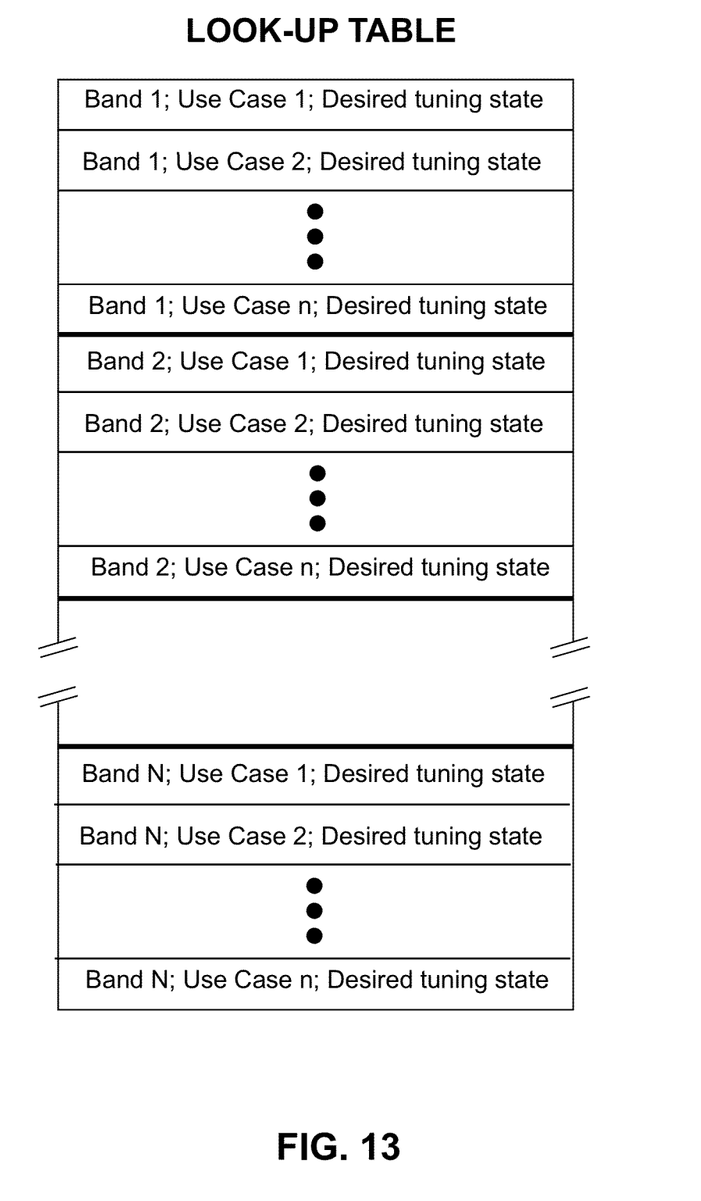
FIG. 13 depicts an illustrative embodiment of a look-up table utilized by the communication device for controlling the matching network of the transceiver of FIG. 2.

Once the designer has defined one or more desirable performance characteristics of the communication device 100 in the form of FOMs, the computer 702 can be adapted in step 808 to find a range of tuning states that achieve the desired FOMs by sweeping with a common mathematical model in fine increments to find global optimal performance with respect to the desired FOMs. The computer 702 can be adapted in step 810 to present the user the range of tuning states that achieve the desired FOMs on a per band and per use case basis. The user can select in step 812 portions of the tuning states for storage in a look-up table which can be utilized by the communication device 100 during operation. FIG. 13 depicts an illustration of a look-up table which can be indexed by the controller 106 of the communication device 100 of FIG. 1 during operation according to band, and use case.

During normal operation by consumers, the communication device 100 can detect a number of possible use cases for the device. For instance, the communication device 100 can detect that the consumer has invoked a call or has answered a called based on the state of call processing software operating in the communication device 100. The call processing software operating in the communication device 100 can also detect which band or sub-band is being used for the active call. The communication device 100 can further detect that a flip housing assembly has been opened with a common electro-mechanical sensor.

The communication device 100 can also detect from the call processing software that a Bluetooth headset feature, and a speakerphone feature are disabled while a communication session is taking place. The communication device 100 can also detect with a common electro-mechanical sensor whether an antenna has been raised or is in the closed position. The communication device 100 can also detect with a proximity sensor and/or an orientation sensor (e.g., an accelerometer) whether the device is near a body part of the user, and whether the device is in a horizontal or vertical position.

There are innumerable detectable use cases that are contemplated by the present disclosure. These detectable states in whole or in part can provide the communication device 100 a means to predict a likelihood of any number of use cases. Once a user case is detected, the communication device 100 can index through the look-up table of FIG. 13 according to the frequency band (or sub-band) and the use case to identify a desirable tuning state of the tunable matching network 202 of FIG. 2 that causes the communication device 100 to operate in a desirable manner contemplated by the designer of said communication device 100.

From the foregoing descriptions, it would be evident to an artisan with ordinary skill in the art that the aforementioned embodiments can be modified, reduced, or enhanced without departing from the scope and spirit of the claims described below. For example, FIGS. 1-7 and method 800 of FIG. 8 can be adapted to be used for calibrating a tunable matching network of a wireline transceiver. Method 800 can be applied to innumerable combinations of use cases, bands, sub-sets of bands, and other performance parameters which have not been addressed in the present disclosure. These undisclosed combinations are contemplated by the present disclosure.

Other suitable modifications can be applied to the present disclosure. Accordingly, the reader is directed to the claims for a fuller understanding of the breadth and scope of the present disclosure.

Figure 14:
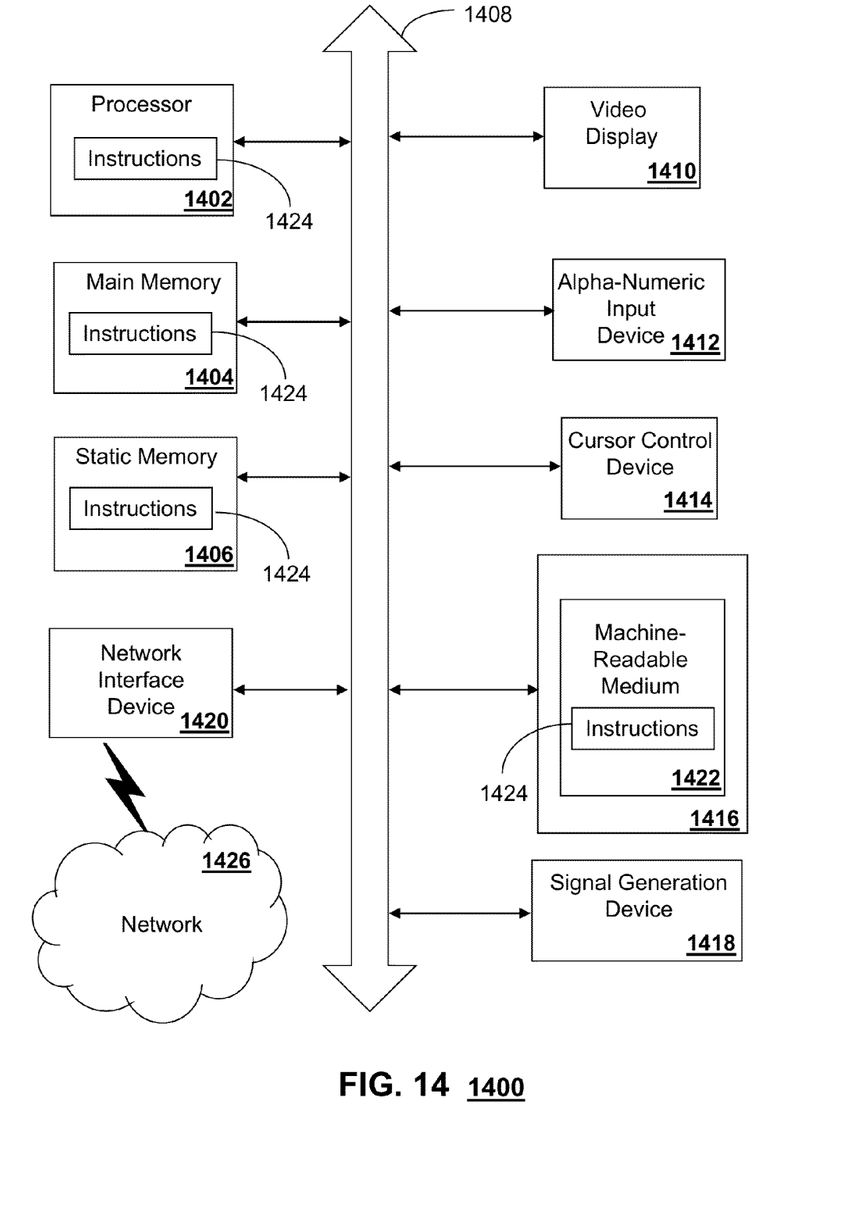
FIG. 14 depicts an exemplary diagrammatic representation of a machine in the form of a computer system within which a set of instructions, when executed, may cause the machine to perform any one or more of the methodologies disclosed herein.

FIG. 14 depicts an exemplary diagrammatic representation of a machine in the form of a computer system 1400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1400 may include a processor 1402 (e.g., a central processing unit (CPU), a graphics processing unit (GPU, or both), a main memory 1404 and a static memory 1406, which communicate with each other via a bus 1408. The computer system 1400 may further include a video display unit 1410 (e.g., a liquid crystal display (LCD), a flat panel, a solid state display, or a cathode ray tube (CRT). The computer system 1400 may include an input device 1412 (e.g., a keyboard), a cursor control device 1414 (e.g., a mouse), a disk drive unit 1416, a signal generation device 1418 (e.g., a speaker or remote control) and a network interface device 1420.

The disk drive unit 1416 may include a machine-readable medium 1422 on which is stored one or more sets of instructions (e.g., software 1424) embodying any one or more of the methodologies or functions described herein, including those methods illustrated above. The instructions 1424 may also reside, completely or at least partially, within the main memory 1404, the static memory 1406, and/or within the processor 1402 during execution thereof by the computer system 1400. The main memory 1404 and the processor 1402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1424, or that which receives and executes instructions 1424 from a propagated signal so that a device connected to a network environment 1426 can send or receive voice, video or data, and to communicate over the network 1426 using the instructions 1424. The instructions 1424 may further be transmitted or received over a network 1426 via the network interface device 1420.

While the machine-readable medium 1422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication device, comprising:
   an antenna;
   a tunable matching network coupled with the antenna, the tunable matching network including at least one variable reactance element;
   a memory that stores instructions; and
   a processor coupled to the memory, wherein execution of the instructions by the processor causes the processor to perform operations comprising:
      selecting a subset of tuning states for the tunable matching network, wherein the subset of tuning states excludes undesired tuning states based on operational specifications for the communication device;
      performing actual measurements of a plurality of performance parameters of the communication device according to the subset of tuning states;
      identifying data sets for the plurality of performance parameters from the subset of tuning states and the actual measurements; and
      determining from the data sets one or more tuning states of the tunable matching network that achieves a performance characteristic of the communication device.

2. The communication device of claim 1, wherein the operations further comprise determining estimated measurements of the plurality of performance parameters for at least a portion of the tuning states not included in the subset of tuning states based on the actual measurements of the plurality of performance parameters, wherein the identifying of the data sets is based in part on the estimated measurements.

3. The communication device of claim 2, wherein the estimated measurements are determined using regression analysis of the actual measurements of the plurality of performance parameters.

4. The communication device of claim 1, wherein the plurality of performance parameters include at least one of total radiated power or total isotropic sensitivity.

5. The communication device of claim 1, wherein each of the data sets has at least two independent variables, and wherein the plurality of performance parameters includes at least one of transmitter power, transmitter efficiency, receiver sensitivity, power consumption of the communication device, a specific absorption rate, total radiated power, total isotropic sensitivity or radiated harmonics measurements.

6. The communication device of claim 5, wherein the at least two independent variables correspond to a combination of at least portions of the tuning states.

7. The communication device of claim 1, wherein the tunable matching network comprises a switchable element that enables or disables at least one fixed reactance element.

8. The communication device of claim 1, wherein the determined one or more tuning states are stored in a look-up table in the memory, and wherein the performance characteristic includes transmit power and receive power.

9. The communication device of claim 1, wherein the communication device is operable at a plurality of frequency bands and a plurality of use cases, and wherein the determining of the one or more tuning states is based on at least one of the plurality of frequency bands and at least one of the plurality of use cases.

10. The communication device of claim 9, wherein the plurality of use cases are determined from a plurality of operational states of the communication device.

11. The communication device of claim 10, wherein the plurality of operational states correspond to at least one of a group of operational states comprising a state of use of the antenna of the communication, a state of use of a speakerphone feature of the communication, a state of use of a multi-configurable housing assembly of the communication device, a state of use of a hands-free feature of the communication device, and a state of a detectable proximity of a user to the communication device.

12. A method, comprising:
obtaining, by a system including a processor, a measurement of a performance parameter of a communication device according to a subset of tuning states of a tunable reactive element of the communication device;
determining, by the system, an estimated measurement of the performance parameter for at least a portion of tuning states not included in the subset of tuning states based on the measurement of the performance parameter;
determining, by the system, a multi-dimensional data set for the performance parameter from at least a portion of the subset of tuning states, the obtained measurement and the estimated measurement; and
enabling a user selection from among the subset of tuning states for storage in a look-up table which can be used by the communication device for tuning the tunable reactive element, wherein the subset of tuning states excludes undesired tuning states based on operational specifications for the communication device.

13. The method of claim 12, wherein the determining of the estimated measurement for the performance parameter is according to regression analysis applied to the obtained measurement, wherein the performance parameter includes transmitter power, wherein the performance parameter is associated with a receive mode and a transmit mode of the communication device, and wherein the enabling of the user selection is while the communication device is in operation.

14. The method of claim 13, wherein the regression analysis is at least of a fourth order.

15. The method of claim 12, wherein the performance parameter includes receiver sensitivity.

16. The method of claim 12, wherein the performance parameter includes radiated harmonics measurements.

17. The method of claim 12, wherein the performance parameter includes transmitter efficiency.

18. The method of claim 12, wherein the performance parameter includes total isotropic sensitivity.

19. A communication device, comprising:
an antenna;
a tunable matching network coupled with the antenna, wherein the tunable matching network comprises at least one of a first tunable reactance circuit having at least one tunable reactive element, or a second tunable reactance circuit having at least one switchable element that enables or disables at least one fixed reactance element;
a memory that stores instructions; and
a processor coupled to the memory, wherein execution of the instructions by the processor causes the processor to perform operations comprising:
retrieving actual measurements of a performance parameter of the communication device according to a subset of tuning states of the tunable matching network, wherein the subset of tuning states excludes undesired tuning states based on operational specifications for the communication device;
identifying data sets for the performance parameter from at least portions of the tuning states and the actual measurements; and
determining from at least a portion of the data sets tuning states that achieve a performance characteristic of the communication device.

20. The communication device of claim 19, wherein the operations further comprise:
determining estimated measurements of the performance parameter for at least a portion of the tuning states not included in the subset of tuning states based on the actual measurements,
wherein the identifying of the data sets for the performance parameter is based in part on the estimated measurements.

* * * * *